(12) United States Patent
Fan et al.

(10) Patent No.: US 9,898,258 B2
(45) Date of Patent: Feb. 20, 2018

(54) VERSIONING OF BUILD ENVIRONMENT INFORMATION

(71) Applicant: INTERNATIONAL BUSINESS MACHINES CORPORATION, Armonk, NY (US)

(72) Inventors: Si Bin Fan, Beijing (CN); Chan Gao, Beijing (CN); Peng Hui Jiang, Beijing (CN); Miao Liu, Beijing (CN); Su Liu, Austin, TX (US); Chih-Wen Su, Taipei (TW); Yan Sun, Beijing (TW); Wen Yin, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/168,480

(22) Filed: May 31, 2016

(65) Prior Publication Data
US 2017/0344345 A1    Nov. 30, 2017

(51) Int. Cl.
*G06F 9/45* (2006.01)
*G06F 9/44* (2006.01)

(52) U.S. Cl.
CPC ...................................... *G06F 8/30* (2013.01)

(58) Field of Classification Search
CPC .......................................................... G06F 8/30
USPC ......................................................... 717/106
See application file for complete search history.

(56) References Cited

U.S. PATENT DOCUMENTS

| 7,519,953 | B2 | 4/2009 | Reissman et al. |
| 7,694,291 | B2 | 4/2010 | Chen et al. |
| 8,285,662 | B2 | 10/2012 | Bitonti et al. |
| 8,312,447 | B2 | 11/2012 | Callaghan et al. |
| 8,957,938 | B2 | 2/2015 | Lei |
| 9,250,893 | B2 * | 2/2016 | Blahaerath ................ G06F 8/71 |
| 9,286,040 | B2 * | 3/2016 | Halley ...................... G06F 8/30 |
| 9,652,225 | B1 * | 5/2017 | Bohn .................... G06F 11/362 |
| 2006/0164410 | A1 * | 7/2006 | Li ........................... G06T 15/08 |
| | | | 345/419 |
| 2007/0050762 | A1 * | 3/2007 | Chen ........................ G06F 8/71 |
| | | | 717/169 |
| 2008/0244522 | A1 * | 10/2008 | Bernin ..................... G06F 8/71 |
| | | | 717/122 |
| 2009/0319342 | A1 * | 12/2009 | Shilman ............ G06F 17/30864 |
| | | | 705/7.41 |
| 2010/0138810 | A1 * | 6/2010 | Komatsu .................. G06F 8/30 |
| | | | 717/107 |
| 2011/0209923 | A1 * | 9/2011 | Schererz .............. G01G 19/005 |
| | | | 177/1 |
| 2012/0324417 | A1 * | 12/2012 | Somani .................... G06F 8/30 |
| | | | 717/101 |

(Continued)

OTHER PUBLICATIONS

Herlocker et al. "An Algorithmic Framework for Performing Collaborative Filtering", ACM 1999.*

(Continued)

*Primary Examiner* — Wei Zhen
*Assistant Examiner* — Junchun Wu
(74) *Attorney, Agent, or Firm* — L. Jeffrey Kelly

(57) ABSTRACT

A method includes collecting information corresponding to a build environment in which a build result of a source code is generated, the collected information including one or more predefined build environment factors, and storing, in a repository, the collected information as a version of the build environment.

20 Claims, 8 Drawing Sheets

(56) References Cited

U.S. PATENT DOCUMENTS

2015/0248280 A1* 9/2015 Pillay .................. G06F 8/60
  717/106
2016/0162906 A1* 6/2016 Irby .................. G06Q 30/018
  705/317
2017/0052880 A1* 2/2017 Rosomoff .............. G06F 8/70

OTHER PUBLICATIONS

Kumar et al. "Building Personal Collections and Networks of Digital Objects in a Fedora Repository Using VUE", Tufts University, 2006.*
Srivastava et al. " Effectively Prioritizing Tests in Development Environment", ACM 2002.*
Tichy, "RCS—A System for Version Control", Department of Computer Sciences, Purdue University, West Lafayette, Indiana 47907, An earlier version of this paper was published in Software—Practice & Experience 15, (Jul. 7, 1985), 537-654.
Mell et al., "The NIST Definition of Cloud Computing", Special Publication 800-145, National Institute of Standards and Technology, U.S. Department of Commerce, Recommendations of the National Institute of Standards and Technology, Sep. 2011, 7 pages.

* cited by examiner

Delta of BEI

| Environment Change | Type | Severity | Recommendation |
|---|---|---|---|
| Windows 2008 -> Windows 2012 | OS level | High | Mitigation Plan #1: ... |
| Compiler change: ... | Compiler level | Medium | Mitigation Plan #2: ... |
| DateTime change: ... | DateTime level | Low | Mitigation Plan #3: ... |
| ... | ... | .... | ... |

VERSIONING OF BUILD ENVIRONMENT INFORMATION

BACKGROUND

The present disclosure generally relates to software development, and more specifically to versioning of build environment information.

In software development, a source code is programmed by a developer and then built on a build machine to generate a build result (also referred to as a build) which is usually a binary file (or binary) or a bytecode file. The term "build" typically refers to the process of converting source codes into software artifacts (e.g., binaries) that can be run on a computer. The build process may be performed regularly (e.g., daily or weekly) or as required. The generated binaries may then be tested or delivered to clients.

The source code may be frequently revised by the developer during development of the software. A version control (or revision control) is typically used to keep track of the evolution of a source code. In computer software engineering, the version control allows to track and control changes to the source code. Software developers may sometimes use a version control software to maintain different versions of the source code.

SUMMARY

According to an embodiment of the present disclosure, a method includes collecting environment information of a build environment in which a build result of a source code is generated, according to one or more predefined build environment factors. The method further includes storing data representing the environment information as a version of build environment information.

According to another embodiment of the present disclosure, a computing system includes a processor and a computer-readable memory unit coupled to the processor, the memory unit includes instructions that when executed by the processor perform actions of collecting environment information of a build environment in which a build result of a source code is generated, according to one or more predefined build environment factors, and storing data representing the environment information as a version of build environment information.

According to another embodiment of the present disclosure a computer program product includes a computer readable storage medium having program instructions embodied therewith. The program instructions are executable by a processor to cause the processor to, collect environment information of a build environment in which a build result of a source code is generated, according to one or more predefined build environment factors, and store data representing the environment information as a version of the build environment information.

BRIEF DESCRIPTION OF THE DRAWINGS

The following detailed description, given by way of example and not intended to limit the invention solely thereto, will best be appreciated in conjunction with the accompanying drawings, in which:

FIG. 4 shows an exemplary data structure of the stored build environment information, according to an embodiment of the present disclosure;

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
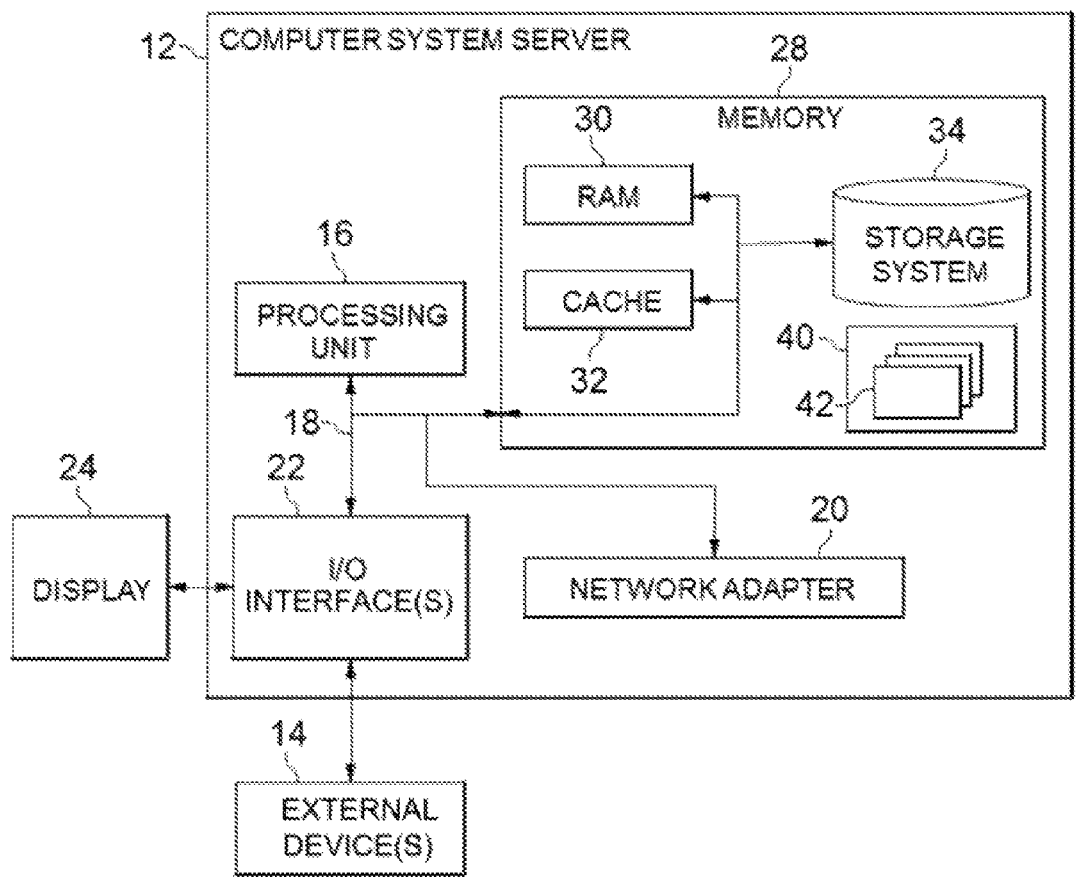
FIG. 1 is an exemplary computer system, according to an embodiment of the present disclosure.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

During software development, a source code may be frequently revised and/or built to generate binaries for testing or deployment. In some cases, the same source code may be built several times in different build environments for different uses. During the build process, both the source code and the build environment may affect the build result. For example, different build results may be generated from the same source code in different build environments.

A build environment may include many environment factors, such as platform (e.g., x86 platform or ARM platform), operating system (e.g., Windows or Linux), patch of operating system, compiler, runtime of compiler, linker, libraries used by compiler and linker, hardware configuration of build machine, preferences of build machine, or other environment information from a build machine. Many of these factors may affect the build result, and sometimes may further affect the operability of the generated binaries.

For example, different binaries may be generated from different versions of a compiler or linker, or different Windows updates installed on the build machines may result in different binaries even for the same source code. In the case where the updates involve different runtime libraries, the generated build may have dependency on the runtime library and may cause failures when running in an environment without the dependent runtime library. In such a case, knowledge of the build environment may be useful to address the problem caused by the absence of a proper runtime library.

Furthermore, in some instances, after a build is tested and deployed to a client, another build may be generated even if there is no change in the source code. In such cases, the difference between the two builds may be generally caused by the build environment, as such focus on changes in the build environment is required during the testing stage of a software.

Another situation in which the build result may be affected by the build environment may include a cloud computing environment including a plurality of build machines (hereinafter "build machines") that have, among others, different compiler settings including optimization level, library paths, header file links, and so on. In each build process, one or more of the build machines may be selected to generate a build result, and it may be necessary to record which one(s) of the build machines is used, as well as other build environment information such as the compiler settings, this may help identifying and fixing errors caused by changes in the build environment during the software testing stage, deployment stage or maintenance stage.

It should be noted that currently in the art there are a variety of tools for versioning of a source code during software development, however versioning of build environment information to identify and reduce errors in a build result caused by changes in the build environment has not yet been considered.

Therefore, embodiments of the present disclosure may, among other potential benefits, allow the versioning of a build environment such that recording of build environment information may be performed for future use. As such, differences between build results generated as a consequence of changes in the build environment may be identified in order to correct and/or prevent related errors.

The present disclosure generally relates to software development, and more specifically to versioning of build environment information.

Referring now to FIG. 1, an exemplary computer system/server 12 which is applicable to implement the embodiments of the present disclosure is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components may be used in conjunction with computer system/server 12. Examples, include, but are not limited to: microcode, device drivers, redundant processing units, external disk drive arrays, RAID systems, tape drives, and data archival storage systems, etc.

It should be noted that embodiments of the present disclosure may be implemented as the program/utility 40 or the program modules 42 of FIG. 1.

Figure 2:
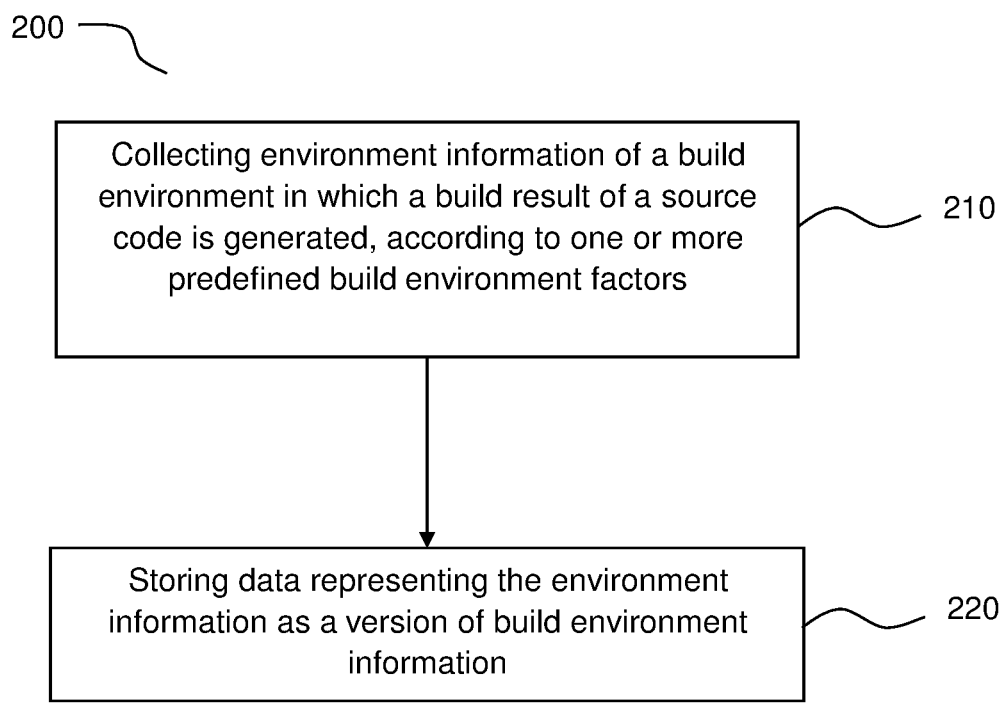
FIG. 2 is a flow chart showing an exemplary method for versioning of build environment information, according to an embodiment of the present disclosure.

Referring now to FIG. 2, a flowchart describing an exemplary method 200 is shown, according to an embodiment of the present disclosure. The method 200 may be executed each time a build process is performed on one or more build machines, such that a series of versions of a build environment for a software can be stored for subsequent retrieval and use.

At block 210, environment information corresponding to the build environment in which a build result of a source code is generated is collected according to one or more predefined build environment factors. The build environment may include a variety of information regarding different build environment factors in the build process, and information regarding the one or more predefined build environment factors.

The build environment factors (also referred to as "environment factors") may generally include one or more of a platform, operating system, patch of operating system, compiler, linker, runtime of compiler, libraries used by compiler and linker, hardware configuration of build machine, preferences of build machine, and so on. The preferences for a build machine may include, for example, DateTime (a parameter indicating the current date and time), time zone, location (e.g., language, character set, currency, etc.) of the build machine. The environment information to be collected depends on the predefined build environment factors, which may be set and adjusted by a user (e.g., the developer or the tester). For example, the user may predefine a large number of environment factors in order to collect as much environment information as possible. Alternatively, the user may predefine only a few factors to selectively collect a part of the whole environment information. For example, if all the build machines operate in Linux, then environment information regarding factors specific to a Windows operating system may not be collected.

At block 220, data representing the environment information is stored, for example, in a repository as a version of the build environment information. In one embodiment, the data representing the build environment information may be the collected environment information per se, which may be, for example, a snapshot of the build environment. In another embodiment, the collected environment information may be further processed before the storing. For example, the collected environment information may be filtered according to some criteria and/or be compared with a previous snapshot of the build environment to determine a difference, and the data representing the environment information may be the filtered environment information or the difference between two snapshots as will be described in detail below.

As such, the build environment information for each build result during the software development may be stored and form a version tree showing the evolution of build environment information for the software, which may be similar to the versioning of the source code. It should be noted that, in the above example, although the environment information is processed before being stored in the repository, it may, as an addition or alternative, be processed after the storing step.

Figure 3:
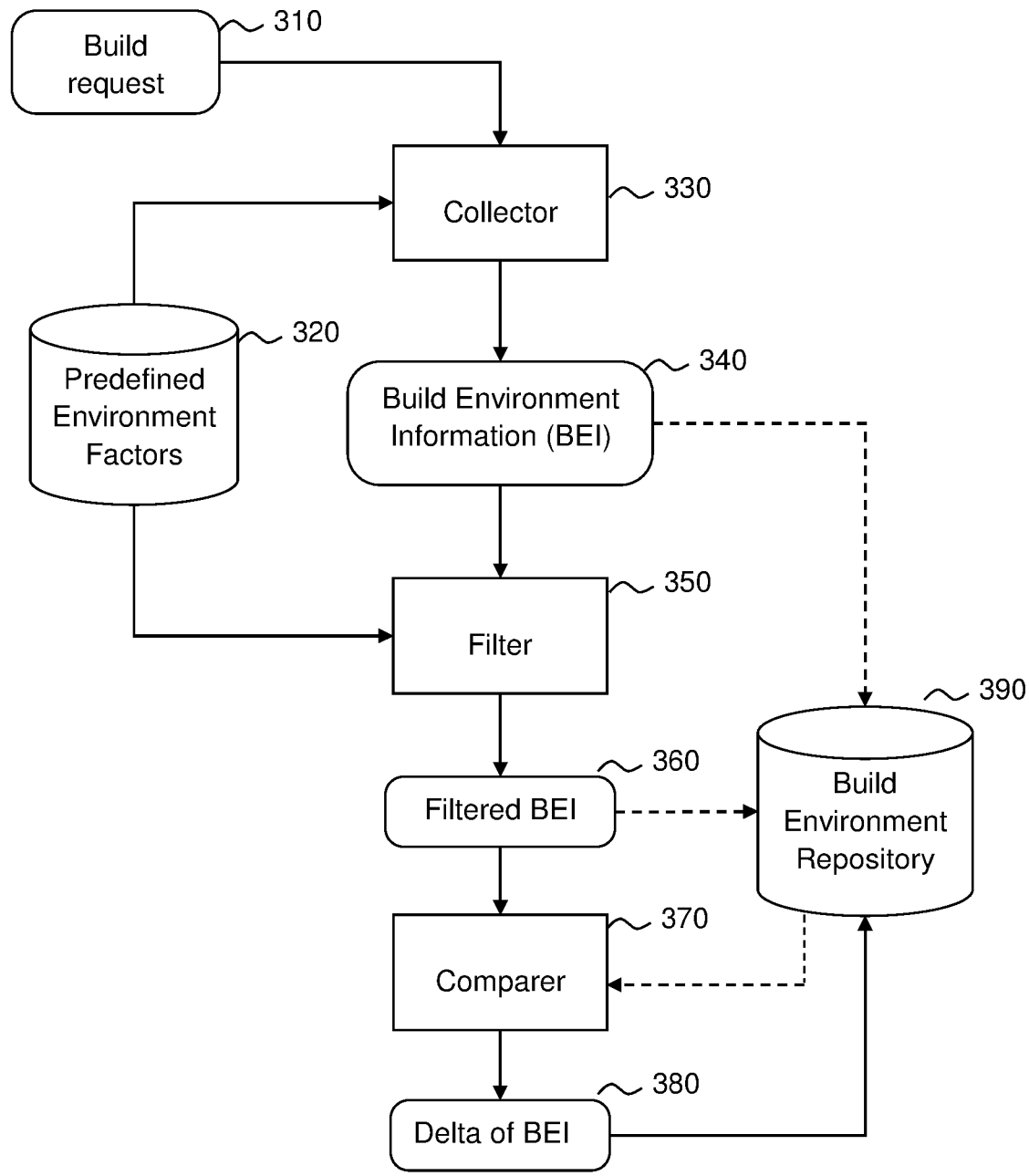
FIG. 3 is a block diagram illustrating an exemplary system for versioning of build environment information, according to an embodiment of the present disclosure.

Referring now to FIG. 3, a block diagram illustrating an exemplary system for versioning of a build environment is shown, according to an embodiment of the present disclosure. In this figure, the rectangular blocks denote processing logics, and the rounded rectangular blocks denote data or artifacts of the processing. It may be appreciated that, any one of the processing logics may be implemented by a software (such as it is run on a general-purpose computer or a dedicated computer), a hardware (circuitry, dedicated chip, etc.), or a combination of both. For example, the processing logics shown in FIG. 3 may be implemented as software running on the computer system/server 12 of FIG. 1.

With continued reference to FIG. 3, a build request 310 for a source code may be submitted by a user or automatically triggered according to a predetermined schedule. In response to the build request 310, the build machine operates to generate a build result (e.g., a binary) from the source code. During or after the build process, the collector 330 collects information of the build environment according to the predefined build environment factor(s) 320. Accordingly, the collected build environment information may include one or more items of information regarding the one or more predefined build environment factors. As mentioned above, the predefined build environment factors may include one or more of a platform, operating system, patch of operating system, compiler, linker, runtime of compiler, libraries used by compiler and linker, hardware configuration of build machine, preferences of build machine, or other environment information from build machine.

The collection of the build environment information may be performed by invoking system functions or by reading log files or configuration files in the build machine. For example, information regarding the operating system, such as the version of the operating system, may be collected by invoking system functions during the build process. As another example, information regarding the compiler, such as compiler version and compiler settings, may be collected by reading the configuration files of the compiler or by running commands provided by the compiler. It may be appreciated that the collection is not limited to these examples and may be performed in various ways known by a person skilled in the art.

The output of the collector 330 is shown in FIG. 3 as the build environment information (BEI) 340, which is a snapshot of the build environment. According to an embodiment, the BEI 340 may be directly stored in the build environment repository 390 as a version of the build environment information. Alternatively or in addition, the BEI 340 may be further processed before the storing, as will be described in detail below.

According to one embodiment, the BEI 340 may be filtered by the filter 350. The filtering may be performed in order to focus on the factors that are more significant for testing and/or debugging. For example, the build environment information, such as user private data or temporary files in the build machine, may be filtered out since their contribution to the build result is typically negligible.

In another embodiment, each predefined environment factor may be assigned a weight, and the BEI 340 may be filtered based on the weights of the factors. For example, a threshold may be set and the items of information in the BEI 340 corresponding to the factors having weights higher than the threshold may be retained, while the other items may be filtered out. The weights assigned to the factors may be adjusted by the user as necessary.

In yet another embodiment, the filtering may be performed in response to the user having selected some of the predefined environment factors via a user interface. As a result, the BEI 340 may be filtered such that it only includes environment information regarding the selected one or more predefined build environment factors. It should be noted that other ways of filtering the BEI 340 may also be contemplated, and the filtering criteria may be changed or customized.

For example, DateTime is usually considered an irrelevant build environment factor and as such it is usually filtered out. However, the DateTime factor becomes important to address the Millennium bug (also called Year 2000 problem, which is a problem for documentation and data storage situations that resulted from the practice of truncating a four-digit year to two digits), and may be retained in related situations by, for example, user selection or weight adjustment.

The filtered BEI 360 may be stored in the build environment repository 390 instead of the BEI 340 as a version of build environment information. In another embodiment, both the BEI 340 and the filtered BEI 360 may be stored for different uses. For example, in some cases, a complete record of the BEI 340 may also be maintained to help restore the historical build environment.

According to one embodiment, the filtered BEI 360 may be compared by the comparer 370 with environment information corresponding to a build environment in which a previous build result was generated, in order to determine the difference between them. The build environment information of the previous build may be obtained from the build environment repository 390. The output of the comparer 370 is shown as a delta of BEI 380. It may be appreciated that although the comparison is made for the filtered BEI 360, it may also be made for the BEI 340 in a similar way.

The delta of BEI 380 may then be stored in the build environment repository 390 as a version of the current build environment. By storing the delta of BEI 380 instead of the BEI 340 or the filtered BEI 360, the required storage space is less than that of a complete record of environment information and more importantly, the delta of BEI 380 may reflect the change of build environment in a more straight-forward way. Nevertheless, it is also feasible to alternatively or additionally store the BEI 340 and/or the filtered BEI 360.

As the filtered BEI 360 may include information regarding one or more environment factors, the delta of BEI 380 may be stored as a list of entries, each of which records a change in a corresponding environment factor. If there is no change in an environment factor, there may be no corresponding entry contained in the stored list. According to one embodiment, at least one entry in the stored list may further include a recommendation for addressing the possible problem due to the change in the corresponding factor. The recommendation may include adjusting the build environment, revising the source code, and so on. For example, with respect to a change in compiler settings, the recommendation may include adjusting compiler settings, while with respect to a change from a 32-bit to a 64-bit architecture as a fundamental alteration, the recommendation may include revising the source code.

Referring now to FIG. 4, an exemplary data structure of a delta of BEI (e.g., the delta of BEI 380 in FIG. 3) stored in a build environment repository is shown, according to an embodiment of the present disclosure. The build environment repository (e.g., the repository 390 in FIG. 3) may include four columns: Environment Change, Type, Severity and Recommendation. It should be noted that the environment changes shown in FIG. 4 only provide a general description for the purpose of illustration.

With continued reference to FIG. 4, the stored delta of BEI may include a plurality of entries recording the changes in different environment factors (e.g., the Environment Change column). Each entry may further include a recommendation, such as a particular mitigation plan for addressing the problem caused by the corresponding environment change, as shown in the Recommendation column. In some embodiments, the entry may also contain the type of change (e.g., the Type column including, for example, the change pertaining to operating system (OS) level, compiler level, DateTime level, etc.) and the severity of the change (e.g., the Severity column, including, for example, high, medium or low). The environment change in each entry may be obtained from the collected environment information, such as the BEI 340, the filtered BEI 360 or the delta of BEI 380. The type of change may be associated with the build environment factor corresponding to the change. For example, a type of the change may correspond to a build environment factor, a group of related build environment factors, or a sub-factor of a build environment factor. The severity and recommendation may also be associated with the environment factor or the type of change, and may be predefined and modified by a user (e.g., the developer or the tester) according to the specific software under development or according to the progress of the development.

It should be noted that FIG. 4 merely shows an exemplary illustration of a data structure that may be used for storing the delta of BEI, which, however, may vary in a variety of ways according to actual situations. For example, in one embodiment, the data structure may further include an ID column including an ID for each entry. For example, in another embodiment, any of the Severity column, the Type column, or the Recommendation column may be omitted from the data structure.

Figure 5A:
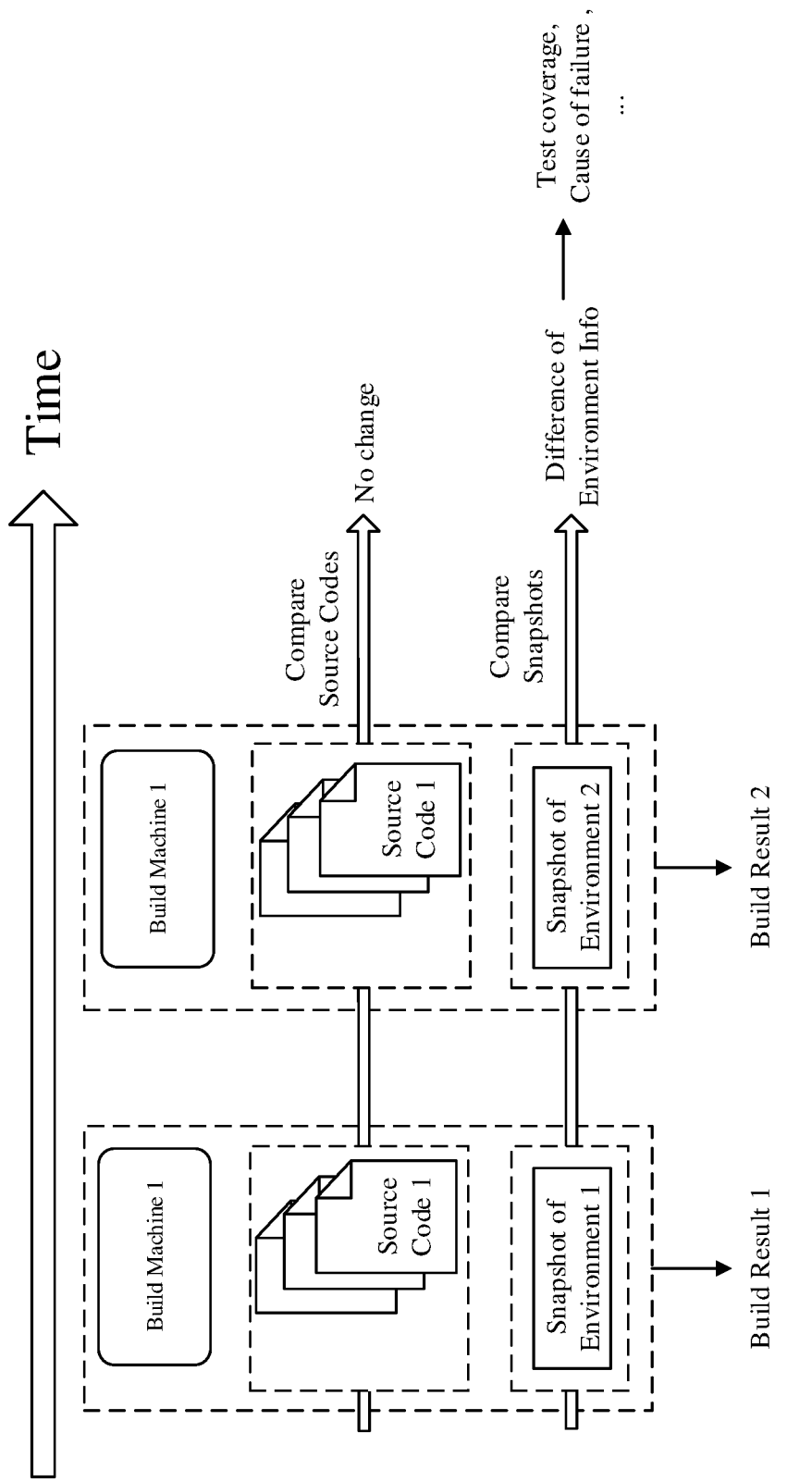
FIG. 5A is a schematic diagram depicting an example of a build environment and its related operations, according to an embodiment of the present disclosure.

Referring now to FIG. 5A, an exemplary situation in which one build machine is used for two build processes at different times without changes to the source code is described, according to an embodiment of the present disclosure. Such situation may occur when a new build is generated without modifying the source code after a previous build of the source code has been tested and deployed to the client.

As depicted in FIG. 5A, the two build processes for the same source code are performed on the same build machine at different times which generates two build results. The build environment information may be collected for each build process to obtain a snapshot of the build environment, such as the BEI 340 in FIG. 3. The source codes in the two build processes may be compared by an existing versioning control tool of source code. Snapshots of the build environment corresponding to the two build processes may also be compared (e.g., by the comparer 370 in FIG. 3) to track the differences between them. It should be noted that the snapshots of the build environment may be further processed (e.g., filtered by the filter 350 in FIG. 3) before performing the comparison.

In the example of FIG. 5A, there is no change in the source code. Since the build machine is the same for the two build processes, the difference between the two snapshots may mainly include the time-varying settings and parameters of the build machine. Therefore, the subsequent testing for the new build result may focus on the possible issues caused by the change of these settings and parameters without considering the source code, since the previous build result has passed the test and been deployed to the client.

As shown in FIG. 5A, the test coverage for testing the build result may be determined based on the difference of build environment information, and the source code may contribute little to the test coverage. As an example, if the difference of environment information shows there is a change in a Windows update, then a test may be designed to verify the dependency of the new build result on the runtime library.

Moreover, the build environment information may also help identify a cause of failure during the deployment or maintenance of the software. For example, a failure may occur when the software is running on a client's machine although it may have worked well during the development. This may be caused by a mismatch between the build environment and the running environment, such as the availability of an external library. Then, the recorded historical build environment information may be retrieved to identify and address the problem.

It should be noted that, although the difference of environment information is recorded and used as shown in FIG. 5A, the build environment information may be recorded instead, and the difference may be determined later if necessary.

Figure 5B:
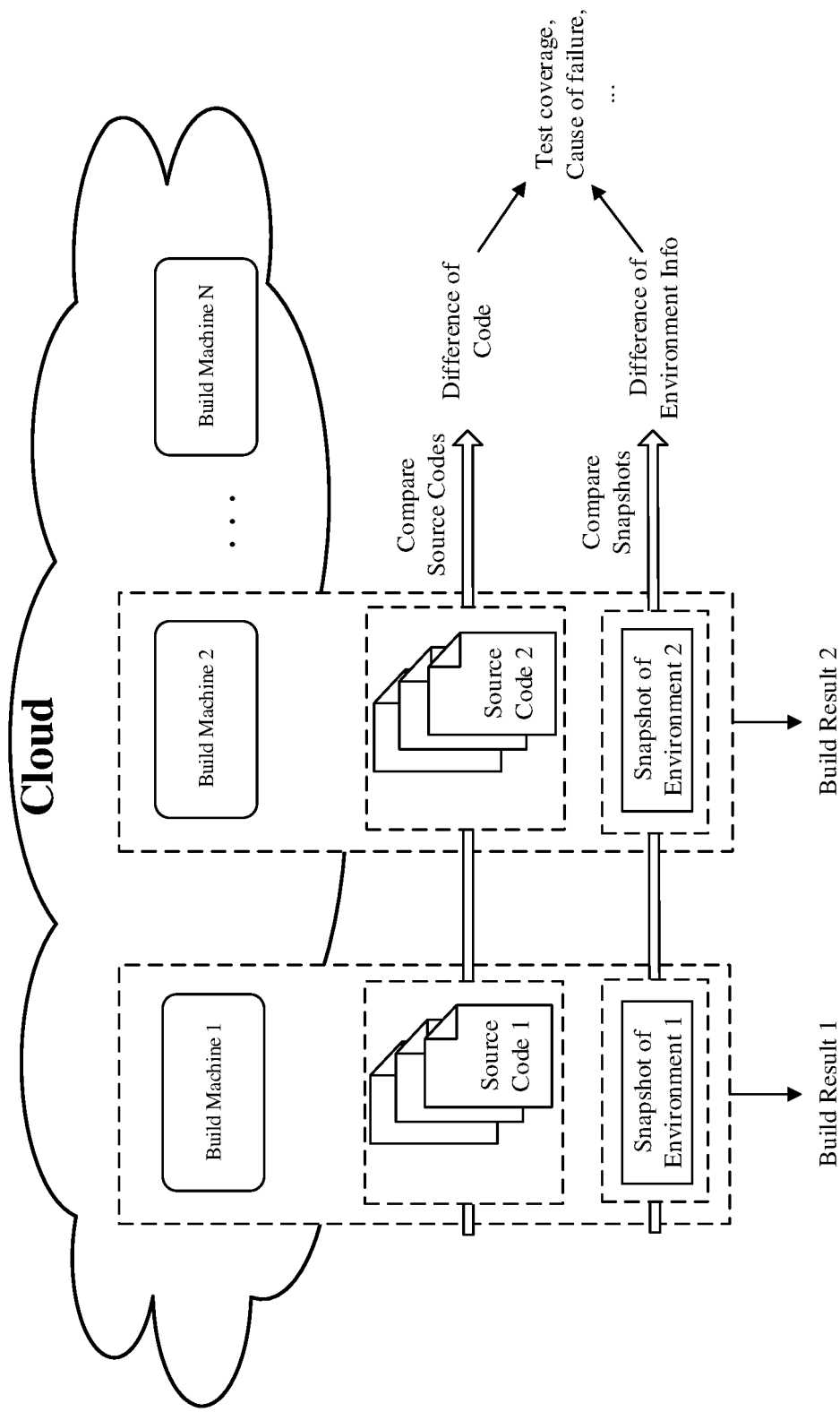
FIG. 5B is a schematic diagram depicting an example of a build environment and its related operations in a cloud computing environment, according to an embodiment of the present disclosure.

Referring now to FIG. 5B, an exemplary situation in which the build process is performed in a cloud computing environment including a plurality of build machines is described, according to an embodiment of the present disclosure. As shown in FIG. 5B, two versions of source codes are built on two different build machines, either simultaneously or at different times.

As the source codes in the two build processes are different, both the difference in source codes and the difference in environment information may be used, for example, to determine the test coverage, identify the cause of failure, and so on. Additionally, since the build machines are different, the difference between two snapshots may be larger than that calculated in FIG. 5A. It should be noted that most of the operations in the example of FIG. 5B are similar to those described in FIG. 5A and thus a detailed description have been omitted.

A cloud computing environment (e.g. cloud computing environment 600 in FIG. 6) is common in the development of large-scale software, where build processes may be performed frequently on a plurality of build machines (e.g., cloud computing nodes 100 in FIG. 6) having different build environments. For example, in the cloud computing environment, there may be some machines for daily build cycle and other machines for weekly build cycle for the purpose of software testing. Therefore, failures in the testing may result from not only source code changes but also build environment changes. In some instances, errors caused by source code changes and those cause by build environment changes need to be separated. In such instances, the recording of build environment information may help find the cause of failure and distinguish the two types of errors.

It should be noted that the proposed method may be applied in various situations and is not limited to the examples described above with reference to FIGS. 5A and 5B. For example, in one embodiment, for a distributed compiling environment, different build machines may be selected in a build process to build different parts of the source code. Then the build environment information of all the build machines may be collected and merged to obtain a complete version of the build environment information.

It should also be noted that the present invention may be integrated into an existing development toolkit to enhance the functionality of the toolkit. Alternatively, the present invention may be implemented as a standalone product and cooperate with other tools in software development and deployment.

Therefore, embodiments of the present disclosure may provide a method, system and computer program product for versioning of build environment information. As such, when a build is generated, the output not only includes a binary file but may also include the environment information of the build being versioned. In the proposed method a collector of build environment gathers environment information according to pre-defined environment factors, and the collected environment information is sent to a classifier where this information is categorized as "determined factor" and/or "unrelated factors".

Additionally, the comparer may execute comparisons between a current build environment and a build environment from a previous build, and then generate a delta for the new build environment version. The current build environment settings, factors, variables, or even system profiles and building profiles may be logged, saved, integrated into each build binary, and also may be stored in a centralized repository. As such, environment information corresponding to the current build environment may be retrieved when necessary to compare the difference between two build environments.

By applying the proposed method and associated system there is no need to store snapshots of each environment. It may only be required to store a delta part of the environment. Since the build environment is versioned and only the delta part is stored, the build differences may be easily obtained and used through version control tools. It may facilitate finding differences in build environment using the delta instead of the entire environment information which may cause problems when running the binary. Embodiments of the present disclosure may also simplify returning to certain environments.

Furthermore, the stored build environment information may be used in any build system, this may be of particular interest during periods of frequent iteration, especially in agile DevOps and complex build infrastructures generally used in cloud computing platforms.

Finally, embodiments of the present disclosure may be implemented in any products with integrated development, build, test and deployment. As such, the stored basic and delta build information may be used for tracking, analysis, diagnose and remediation of build environment related errors.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
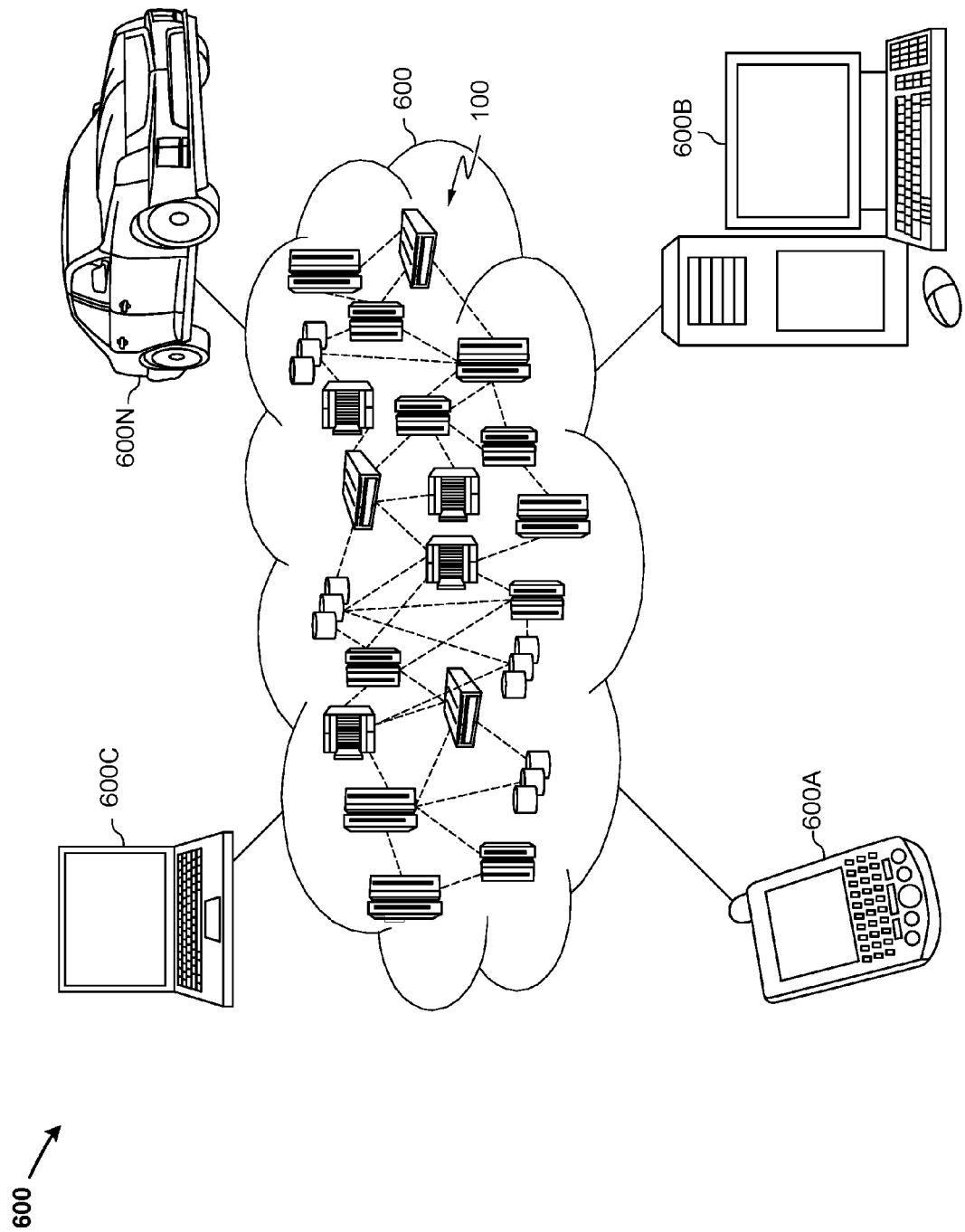
FIG. 6 is a block diagram of an illustrative cloud computing environment, according to an embodiment of the present disclosure.

Referring now to FIG. 6, illustrative cloud computing environment 600 is depicted. As shown, cloud computing environment 600 comprises one or more cloud computing nodes 100 with which local computing devices used by cloud consumers, such as, for example, personal digital assistant (PDA) or cellular telephone 600A, desktop computer 600B, laptop computer 600C, and/or automobile computer system 600N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 600A-N shown in FIG. 6 are intended to be illustrative only and that computing nodes 100 and cloud computing environment 600 can communicate with any type of computerized device over any type of network and/or network addressable connection (e.g., using a web browser).

Figure 7:
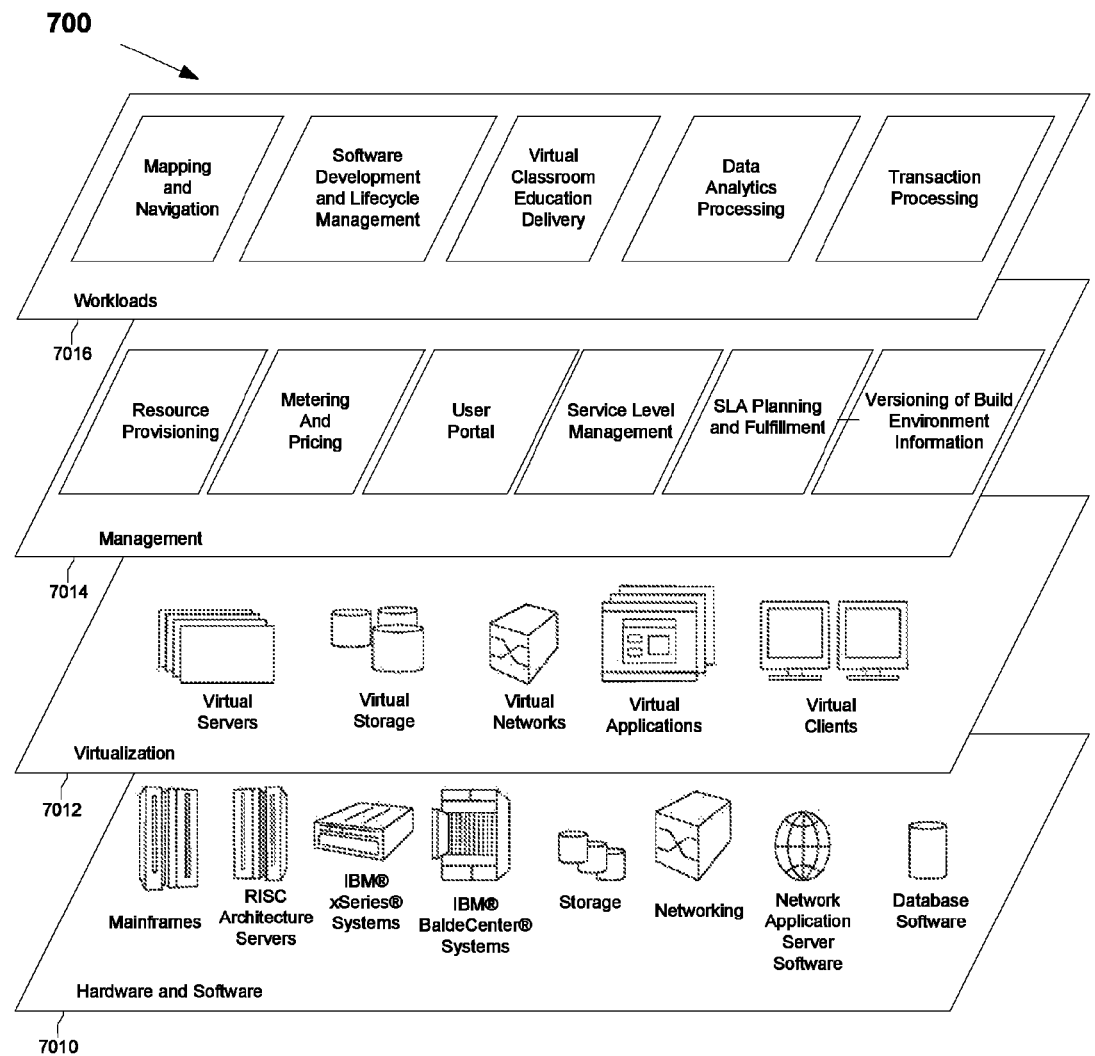
FIG. 7 is a block diagram of functional layers of the illustrative cloud computing environment of FIG. 6, according to an embodiment of the present disclosure.

Referring now to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 7010 includes hardware and software components. Examples of hardware components include: mainframes; RISC (Reduced Instruction Set Computer) architecture based servers; storage devices; networks and networking components. In some embodiments, software components include network application server software.

Virtualization layer 7012 provides an abstraction layer from which the following examples of virtual entities may be provided: virtual servers; virtual storage; virtual networks, including virtual private networks; virtual applications and operating systems; and virtual clients.

In one example, management layer 7014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A program for versioning of build environment information.

Workloads layer 7016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Therefore, according to embodiments of the present disclosure, a method for versioning of build environment information may include collecting information corresponding to a build environment in which a build result of a source code is generated, the collected information may include one or more predefined build environment factors, and storing, in a repository, the collected information as a version of the build environment. The method may further include filtering the collected information such that information regarding at least one predefined build environment factor selected from the one or more predefined build environment factors is obtained. The collected information may be filtered based on weights assigned to the one or more predefined build environment factors. Based on the collected information a difference between the collected information and information corresponding to another build environment in which a previous build result was generated may be determined and stored as a list including one or more entries, each of which records a change in at least one of the one or more predefined build environment factors, and where at least one of the one or more entries may include a recommendation for addressing a problem due to the change in the at least one of the one or more predefined build environment factors. The one or more predefined build environment factors may include at least one of a platform, an operating system, a patch of operating system, a compiler, a linker, a runtime of compiler, libraries used by compiler and linker, a hardware configuration of build machine, or preferences of build machine.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, by a computer, a build request for a source code;
   in response to the received build request, generating a build result from the source code;
   collecting information corresponding to a build environment, wherein the build result of the source code is generated in the build environment, the collected information comprising one or more predefined build environment factors;
   storing, in a build environment repository, the collected information as a version of the build environment;
   assigning a weigh to each of the one or more predefined build environment factors, wherein the assigned weigh is defined by a user according to a relevance of each of the one or more predefined build environment factors;
   based on the assigned weigh being above a predefined weigh threshold, filtering the collected information such that only collected information corresponding to a predefined build environment factor having an assigned weigh higher than the predefined weigh threshold is stored;
   storing, in the build environment repository, the filtered information; and
   determining a difference between the filtered information and information corresponding to another build environment in which a previous build result was generated.

2. The method of claim 1, further comprising:
   storing, in the build environment repository, the difference between the filtered information and the information corresponding to another build environment as a version of the build environment, wherein a required storage space of the difference between the filtered information and the information corresponding to another build environment is less than a required storage space of a complete record of the filtered information.

3. The method of claim 1, wherein filtering the collected information comprises:
   obtaining information regarding at least one predefined build environment factor selected from the one or more predefined build environment factors.

4. The method of claim 1, further comprising:
   filtering the collected information based on at least one predefined build environment factor selected by the user via a user interface such that the filtered information comprises information regarding the at least one predefined build environment factor only.

5. The method of claim 1, wherein the information corresponding to another build environment is obtained from the build environment repository.

6. The method of claim 1, wherein the difference between the filtered information and the information corresponding to another build environment is stored as a list comprising one or more entries, each of which records a change in at least one of the one or more predefined build environment factors, and wherein at least one of the one or more entries comprises a recommendation for addressing a problem due to the change in the at least one of the one or more predefined build environment factors.

7. The method of claim 1, wherein the one or more predefined build environment factors comprises at least one of a platform, an operating system, a patch of operating system, a compiler, a linker, a runtime of compiler, libraries used by compiler and linker, a hardware configuration of build machine, or preferences of build machine.

8. A computer system comprising:
   one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
   receiving, by a computer, a build request for a source code;
   in response to the received build request, generating a build result from the source code;
   collecting information corresponding to a build environment, wherein the build result of the source code is generated in the build environment, the collected information comprising one or more predefined build environment factors;
   storing, in a build environment repository, the collected information as a version of the build environment;
   assigning a weigh to each of the one or more predefined build environment factors, wherein the assigned weigh is defined by a user according to a relevance of each of the one or more predefined build environment factors;
   based on the assigned weigh being above a predefined weigh threshold, filtering the collected information such that only collected information corresponding to a predefined build environment factor having an assigned weigh higher than the predefined weigh threshold is stored;
   storing, in the build environment repository, the filtered information; and
   determining a difference between the filtered information and information corresponding to another build environment in which a previous build result was generated.

9. The computer system of claim 8, further comprising:
   storing, in the build environment repository, the difference between the filtered information and the information corresponding to another build environment as a version of the build environment, wherein a required storage space of the difference between the filtered information and the information corresponding to another build environment is less than a required storage space of a complete record of the filtered information.

10. The computer system of claim 8, wherein filtering the collected information comprises:
    obtaining information regarding at least one predefined build environment factor selected from the one or more predefined build environment factors.

11. The computer system of claim 8, further comprising:
filtering the collected information based on at least one predefined build environment factor selected by the user via a user interface such that the filtered information comprises information regarding the at least one predefined build environment factor only.

12. The computer system of claim 8, wherein the information corresponding to another build environment is obtained from the build environment repository.

13. The computer system of claim 8, wherein the difference between the filtered information and the information corresponding to another build environment is stored as a list comprising one or more entries, each of which records a change in at least one of the one or more predefined build environment factors, and wherein at least one of the one or more entries comprises a recommendation for addressing a problem due to the change in the at least one of the one or more predefined build environment factors.

14. The computer system of claim 8, wherein the one or more predefined build environment factors comprises at least one of a platform, an operating system, a patch of operating system, a compiler, a linker, a runtime of compiler, libraries used by compiler and linker, a hardware configuration of build machine, or preferences of build machine.

15. A computer program product comprising:
one or more computer readable storage media and program instructions stored on at least one of the one or more computer readable storage media, the program instructions executable by a computer to cause the computer to perform a method comprising:
receiving, by a computer, a build request for a source code;
in response to the received build request, generating a build result from the source code;
collecting information corresponding to a build environment, wherein the build result of the source code is generated in the build environment, the collected information comprising one or more predefined build environment factors;
storing, in a build environment repository, the collected information as a version of the build environment;
assigning a weigh to each of the one or more predefined build environment factors, wherein the assigned weigh is defined by a user according to a relevance of each of the one or more predefined build environment factors;
based on the assigned weigh being above a predefined weigh threshold, filtering the collected information such that only collected information corresponding to a predefined build environment factor having an assigned weigh higher than the predefined weigh threshold is stored;
storing, in the build environment repository, the filtered information; and
determining a difference between the filtered information and information corresponding to another build environment in which a previous build result was generated.

16. The computer program product of claim 15, further comprising:
storing, in the build environment repository, the difference between the filtered information and the information corresponding to another build environment as a version of the build environment, wherein a required storage space of the difference between the filtered information and the information corresponding to another build environment is less than a required storage space of a complete record of the filtered information.

17. The computer program product of claim 15, wherein filtering the collected information comprises:
obtaining information regarding at least one predefined build environment factor selected from the one or more predefined build environment factors.

18. The computer program product of claim 15, further comprising:
filtering the collected information based on at least one predefined build environment factor selected by the user via a user interface such that the filtered information comprises information regarding the at least one predefined build environment factor only.

19. The computer program product of claim 15, wherein the information corresponding to another build environment is obtained from the build environment repository.

20. The computer program product of claim 15, wherein the difference between the filtered information and the information corresponding to another build environment is stored as a list comprising one or more entries, each of which records a change in at least one of the one or more predefined build environment factors, and wherein at least one of the one or more entries comprises a recommendation for addressing a problem due to the change in the at least one of the one or more predefined build environment factors.

* * * * *